United States Patent [19]

Case

[11] 3,943,232

[45] Mar. 9, 1976

[54] PROCESS FOR THE DEFLUORINATION OF DILUTE FLUORINE CONTAINING AQUEOUS ACID SOLUTIONS

[75] Inventor: Everett N. Case, Airville, Pa.

[73] Assignee: Atlantic Richfield Company, Los Angeles, Calif.

[22] Filed: Mar. 4, 1974

[21] Appl. No.: 448,153

[52] U.S. Cl............. 423/317; 423/321 R; 423/490
[51] Int. Cl.$^2$........................................ C01B 25/16
[58] Field of Search........... 423/163, 167, 317, 319, 423/320, 321, 490

[56] References Cited
UNITED STATES PATENTS

| | | | |
|---|---|---|---|
| 2,914,474 | 11/1959 | Hillyer................................ | 423/490 |
| 3,118,731 | 1/1964 | Svanoe................................ | 423/317 |
| 3,124,419 | 3/1964 | Germain et al..................... | 423/320 |
| 3,379,501 | 4/1968 | Treitler et al...................... | 423/321 |
| 3,619,136 | 11/1971 | Case................................... | 423/320 |

FOREIGN PATENTS OR APPLICATIONS

| | | | |
|---|---|---|---|
| 1,220,323 | 1969 | United Kingdom................. | 423/321 |

*Primary Examiner*—Oscar R. Vertiz
*Assistant Examiner*—Eugene T. Wheelock
*Attorney, Agent, or Firm*—Delbert E. McCaslin

[57] ABSTRACT

A process is provided whereby dilute aqueous phosphatic acid solutions of 2 to 3 percent or less and containing generally less than 1 percent fluorine are substantially quantitatively defluorinated without loss of the phosphorous or acid values of the water and with a net production of H+ ions from the contained $SiF_6^=$ ions.

7 Claims, 1 Drawing Figure

PROCESS FOR THE DEFLUORINATION OF DILUTE FLUORINE CONTAINING AQUEOUS ACID SOLUTIONS

FIELD OF THE INVENTION

The present invention relates to a process whereby the fluorine content of the process water of a typical wet process phosphoric acid plant is controlled to maintain the fluorine evolution from a cooling pond at zero or a negligible level from a pollution view point and produce a fluorspar of economic value.

In the process of the invention there is no water formed from the acid values in the system; the acid values being conserved for reuse either directly or indirectly. $H^+$ ions are produced from $H_2SiF_6$ in the system which may then be used to produce $H_3PO_4$.

BACKGROUND OF THE INVENTION

Historically wet process phosphoric acid plants have used the following generalized scheme of water recycle for both conservation and economic reasons: From a cooling pond, water is taken to a digester where phosphate rock is digested with phosphoric acid and sulfuric acid to yield a net make phosphoric acid and gypsum (i.e. calcium sulfate dihydrate). These digesters are cooled by evaporating a part of the water. The 30 percent phosphoric acid produced from the above digestion is then concentrated to approximately 54 percent phosphoric acid by vacuum evaporation. The condensates from the cooling and the off gases from the 30 percent acid manufacture and the condensate from the concentration evaporators all contain substantial amounts of fluorine (F) generally in the form of $H_2SiF_6$. These condensates are pumped to a barometric seal tank from which they go to ponds for cooling. All liquid spillage and washings as a result of maintenance also go to the pond. As a result of spray carry over, spillage and washing, the pond accumulates a $P_2O_5$ content of the order to 0.3–0.4 percent. The main rejection mechanism of the fluorine from the fluorapatite feed to the plant is via the product phosphoric acid. Some of the F is rejected by inclusion in the gypsum cake. The sum of fluorine rejected via the above two mechanisms, is less than the F feed to the plant. The imbalance then appears in the process water which slowly increases its F content. Eventually the F content over the process water gets high enough and a new mechanism of rejection comes into play. This rejection mechanism, highly objectionable from an ecological viewpoint, involves F loss to the atmosphere from the pond probably in the form of $SiF_4$. At some point in the processing all three rejection mechanisms must come to some equilibrium. Since the volume of the pond water is so great and the area it must cover so large it is very difficult to calculate the amount of F evolution. However, it is known there is F evolution which can be highly objectionable. The process water should be treated to eliminate or reduce the fluorine content to a negligible level for pollution reasons.

In the prior art, methods have been proposed for fluorine control and recovery from aqueous acidic solutions in a variety of forms which are the outgrowth of a multiplicity of known defluorination techniques. Many of these methods involve the precipitation of insoluble fluosilicates from either the 30 percent or 54 percent phosphoric acid. The removal from the 54 percent acid does not affect the F content of the process water. Removal from the 30 percent acid provides a partial control method and could effect an eventual reduction of F in the process water. Other processes involve the isolation of $H_2SiF_6$ from the evaporator condensates. These processes suffer the disadvantage of being costly and of producing a product of minimal value such as aqueous $H_2SiF_6$ solution. Other processes have been proposed whereby the process water is neutralized with lime or limestone. These processes are costly but acceptable if the process water must be rejected from the recycle system, for example, disposal to water sheds. The neutralization processes involve a change of pH from the <2 range into the 3+ range. The effect of this change is twofold, (1) the F values are precipitated and (2) the phosphoric acid content is also neutralized and frequently precipitated as calcium phosphate. The latter effect causes a loss of phosphorus values. Neutralization of the acid values represented by fluorine acids and phosphoric acid with lime and/or carbonates leads to the formation of water from the associated H+ ions of the phosphoric and fluosilicic acids. Neutralization of the process water with for example, lime or limestone can be considered an acceptable means of treatment provided the process water is to be discarded. However, if such water is to be preserved for reuse, the loss of both the phosphorous values and acid values becomes economically unacceptable.

SUMMARY OF THE INVENTION

An object of the present invention is to remove the F content of a phosphoric acid plant process water in a useful form as $CaF_2$ (Fluorspar).

A further object is to preserve the $H^+$ ions associated with the F in a form which are useful in producing $H_3PO_4$ from these $H^+$ ions and not to destroy the $H^+$ ions associated with the $H_3PO_4$ content of the process water. Lime and limestone, hydroxides and/or carbonates cannot be used in the present invention due to the fact that the valuable $H^+$ ions are destroyed and water is produced.

Additionally, it is an object of the present invention to decrease the F concentration of the process water cooling pond and thereby decrease the F evolution to the atmosphere thus eliminating a pollution problem.

DESCRIPTION OF THE PREFERRED EMBODIMENTS

Figure 1:
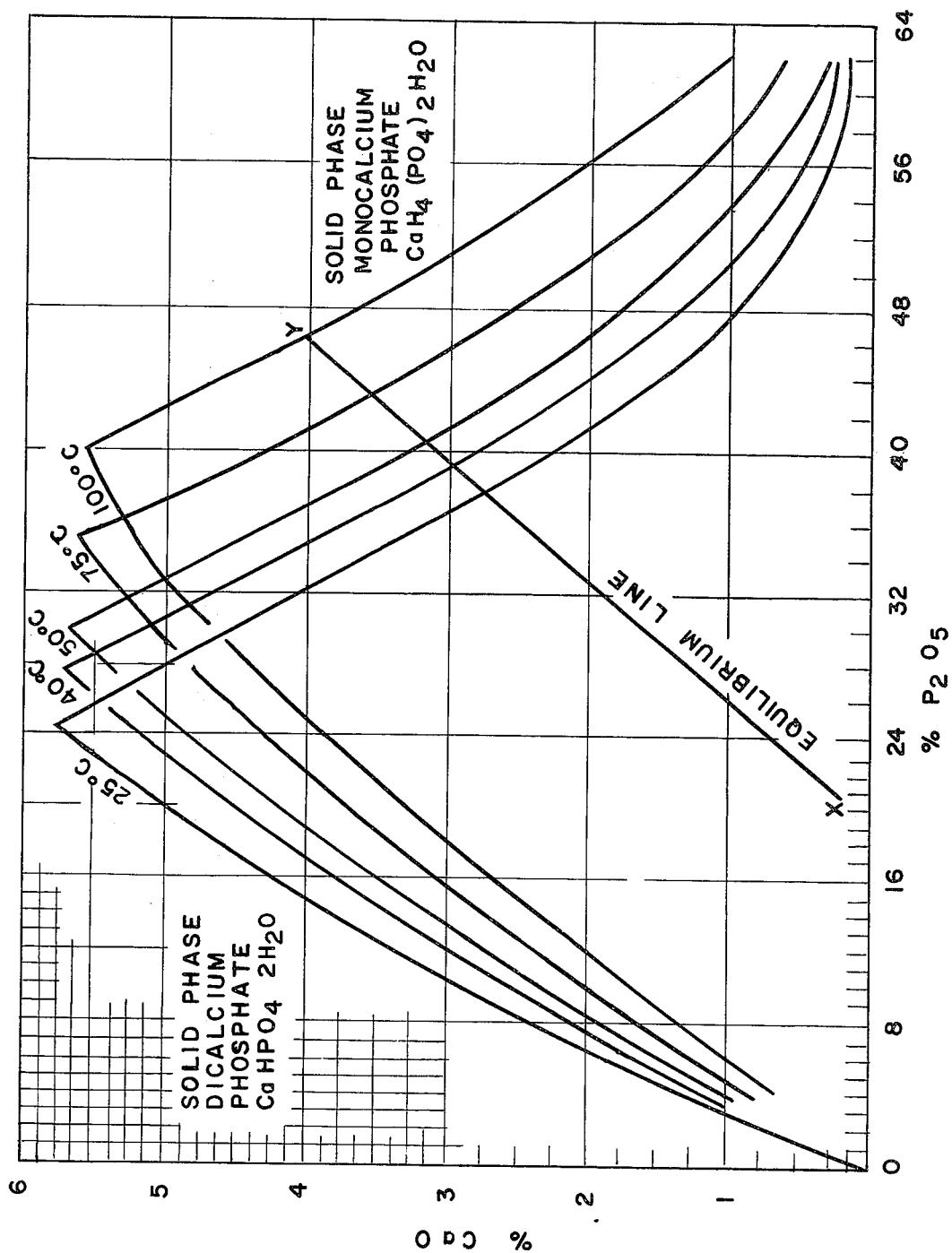

A general understanding of my invention will be facilitated by reference to the drawing which sets out the phase diagram for the system $CaO$—$P_2O_5$—$H_2O$ as disclosed in the 3rd Edition of the monograph "Solubilities of Inorganic and Metal Organic Compounds ", Vol. 1 pp. 321–323, D. Van Nostrand (1940) by Seidell and the supplement in 1952 to the 3rd Edition, pp. 131–132, by Seidell and Linke. The solubility curves at 25°, 40°, 50°, 75° and 100°C. are set out. It will be readily seen that at 25°C. solubility in terms of CaO may go as high as 5.75 percent CaO with 24 percent of $P_2O_5$. The curve at 25°C. from 0 to 25 percent $P_2O_5$ as the highest point represents the solubility curve for dicalcium phosphate ($CaHPO_4.H_2O$). It will be seen that at 100°C. and 24 percent $P_2O_5$ only about 3.8 percent of CaO can remain in solution. Thus if calcium oxide and $P_2O_5$ are allowed to reach equilibrium at 25°C. and the solution is then heated to 100°C. solid dicalcium phosphate will be precipitated. Thus it is clear that in this system at a number of combinations of CaO and $P_2O_5$ concentrations, heating will result in the precipitation of a solid dicalcium phosphate phase. Any such condition I define as a retrograde solubility relationship.

Above about 24–25 percent $P_2O_5$ at 25°C. and up to about 40 percent $P_2O_5$ at 100°C., the equilibrium relationships are complex. Beyond this point of the diagram, the solubility of monocalcium phosphate $CaH_4(PO_4)_2 \cdot H_2O$ increases as the temperature is increased.

There is a line XY, which I designate as the line which defines the lower limit of available calcium in the system. This line, XY, was derived from experimental data using practical times, i.e. within reasonable process operable limits, as the criterion. This line does not represent a true thermodynamic equilibrium but can be approximately described by the following reaction.

$$Ca\ F_{2(solid)} + SiO_{2(solid)} + H^+ \rightleftharpoons Ca^{++} + SiF_6^=$$

The above relation does not show $F^-$ and $SiO_3^=$ ions which must be present at very low concentrations and are the reactants by which the equilibrium is established. The equilibrium line runs approximately through the points 0.1 CaO and 20 percent $P_2O_5$ and about 3 percent CaO and 40 percent $P_2O_5$. Below 20 percent $P_2O_5$, the operable area is any combination of $P_2O_5$ and CaO levels below the maximum solubility line for the temperature used. Thus the solubility lines and the XY line define the area of calcium ion available for formation of calcium fluoride, that is to say my "operating area".

In a system in which the retrograde solubility of dicalcium phosphate is utilized for the precipitation of $CaF_2$ by hydrolysis of silicofluoride ion, the total calcium available is represented by the difference between the initial concentration and the XY line. The time for completion of the reaction varies from minutes to hours depending on the relative availability of $Ca^{++}$ ions. Completion of the reaction occurs when one of the components, available calcium or silicofluoride is depleted.

The XY line may also be related to $CaF_2$ solubility as affected by the pH of the system. This line covers the pH range of 0.1 to 1.75 and since the equilibrium line intersects the $P_2O_5$ axis at about 20 percent $P_2O_5$ the inference can be drawn that below this point any combination of $Ca^{++}$ ions and $F^-$ ions will cause precipitation. This fact is true only within an acidity concept. For example, when the pH of the system is raised above about 2 most of the active $H^+$ ions are destroyed. When the pH of the system is lowered below about 0.1 then the following equilibria $$CaF_2 + 2H^+ \rightleftharpoons 2HF + Ca^{++}$$

$$6HF + SiO_2 \rightleftharpoons H_2SiF_6 + 2H_2O$$

become effective. Therefore, operation at levels below 20 percent $P_2O_5$ are most effective if there is addition of calcium to the system without any substantial change in the pH.

I have discovered that the same relationships hold in dilute solutions of the above components, i.e., in the range of 0.01 to 0.2 percent Ca and 0.01 to 2 percent $P_2O_5$ in the presence of the $SiF_6^=$ ion even though this is not readily discernable from the solubility diagram.

The concept of the invention can be further understood by considering the following situation with respect to pond water. The F content, and the Ca content in the form of soluble $CaSO_4$, do not precipitate $CaF_2$. Therefore, the F cannot be in the form of $F^-$ ions but must be in the form of $SiF_6^=$.

It is known that the following equilbria exist:

$$H_2SiF_6 \rightarrow SiF_4 + 2HF$$

$$SiF_4 + 2H_2O \rightarrow 4HF + SiO_2$$

From the above equations it would appear that some $F^-$ ion is present at all times which must be in exceedingly small amounts since the highly insoluble $CaF_2$ is not produced. Therefore, the F content of the system is almost completely in the form of $SiF_6^=$ ions.

I have discovered that the above described system, which is apparently stable at ambient temperature, will when heated in the range of 80°C. to 100°C. for a sufficient time, usually less than 20 hours, leads to a shift in the equilibrium to produce $CaF_2$ as a precipitate. A study of the stoichiometry involved indicates the following reaction takes place.

$$2H_2O + 6CaSO_4 + H_2SiF_6 \xrightarrow{Heat} 3Ca^{++} + 6HSO_4^- + \lambda\ 3CaF_2 + SiO_2$$

At the higher temperatures, i.e., 100°C. the reaction is relatively fast and is preferred.

The removal of additional $Ca^{++}$ ions from the system would generate an equivalent amount of $H_2SO_4$ which in turn decreases drastically the pH and would solubilize $CaF_2$ with available $SiO_2$ as $H_2SiF_6$. The overall effect is that precipitation of $CaF_2$ is influenced by the above equilibria which are in turn influenced primarily by pH.

The following Examples illustrate the concept of the invention.

EXAMPLE I

A 200 gram portion of process water from a typical phosphoric acid plant containing 0.35 percent $P_2O_5$, 0.21 percent F and 0.16 percent Ca presumably as $CaSO_4$ was heated for 5 hours at 100°C. at which time the water had become cloudy. The water mixture was further heated at 100°C. for an additional 15 hours. At the end of the heating period the solids were separated by filtration and the water analyzed. The F content of the water decreased to 0.12. By calculation based on the above stoichiometry essentially complete reaction was indicated, not with respect to total calcium or fluorine but on the basis of available calcium.

EXAMPLE II

The following Example clearly shows the potential value of this invention.

200 Grams of pond water as described in Example I above was heated at 100°C. in the presence of a two-fold excess $CaSO_4 \cdot 2H_2O$ (approximately 6 grams) based on the above noted stoichiometry. The liquid was sampled from time to time and analyzed for F content with the following results.

| Time (hrs.) | % F |
|---|---|
| 1 | 0.12 |
| 2 | 0.02 |
| 3 | 0.01 |

EXAMPLE III

A reaction similar to that described in Example II above was run on a continuous basis in which the pond water was pumped through a column of phosphate rock of 4 to 8 mesh size (Standard Sieve). The temperature of the water was maintained at 97°C. and the residence time of the water in contact with the phosphate rock in the column was 1 hour. A sample of the pond water effluent from the column showed upon analysis a 0.02 percent F content as compared to the original feed water which contained 0.21 percent F.

Experiments were carried out as in Example II above at temperatures ranging from 80°–100°C. which resulted in complete or partial defluorination.

Batch experiments with phosphate rock and pond water as in Example I above showed the same defluorination effect as with $CaSO_4 \cdot 2H_2O$.

The above procedures clearly indicate that a calcium salt of an acid will cause the $SiF_6^=$ ion to hydrolyze if heated at 80°C.–100°C. for a sufficient time, i.e., on the order of 1 to 20 hours, provided the pH of the resultant solution is not significantly reduced in the process system, e.g., the pH represented by strong acids such as $H_2SO_4$ in dilute solution.

I have discovered a process whereby dilute phosphoric acid solutions can be treated with cheap available materials to obtain almost complete defluorination of the solution. The defluorination is accomplished without the economic loss of the valuable $H^+$ ion content of the system.

The following equations indicate how the potential $H^+$ ion content of the $SiF_6^=$ ion is also utilized to form additional phosphoric acid $$H_2SiF_6 + 2H_2O \rightarrow 6HF + SiO_2$$

$$6HF + Ca_3(PO_4)_2 \rightarrow 3CaF_2 + 2H_3PO_4$$

By the method of the invention substantially complete defluorination of a dilute stream can be accomplished and enables such method to be used to treat any dilute stream in a phosphoric acid plant, for example the condensate stream from rock digestion or a phosphoric acid concentration process, a combination of these as from a common barometric seal tank or the process pond water itself. The method results in substantially complete defluorination of any one or combination of these streams and to an eventual real reduction in the F content of the pond water and consequently a much reduced F evolution to the atmosphere to a zero or negligible level.

The process provides an economic benefit in the manufacture of $CaF_2$ in substantially pure form, i.e., commercial grade fluorspar and also an incremental yield of $H_3PO_4$.

More or less detailed claims will be presented hereinafter and even though such claims rather specific in nature, those skilled in the art to which this invention pertains will recognize that there may be equivalents for the specific materials recited therein. Some of these equivalents will immediately occur to one skilled in the art and still other equivalents could be readily ascertained upon rather simple routine non-inventive experimentation. Certainly no invention would be involved in substituting one or more of such equivalents for the materials specifically recited in the claims. It is intended that all such equivalents be encompassed within the scope of this invention and patent grant in accordance with the well known doctrine of equivalents as well as changing proportions of the ingredients which do not render the composition unsuitable for the disclosed purposes. Therefore, this application for Letters Patent is intended to cover all such modifications, changes, and substitutions as would reasonably fall within the scope of the appended claims.

I claim:

1. In a process for the defluorination of a dilute fluorine-containing aqueous phosphatic acid solution derived from the process water of a wet process phosphoric acid plant said solution containing less than 3 percent $P_2O_5$ the improvement which comprises heating the solution to a temperature in the range of about 80°C. –100°C. in the presence of a solid source of $Ca^{++}$ ions selected from the group consisting of calcium sulfates, calcium phosphates and phosphate rock, for a length of time sufficient to precipitate calcium fluoride from said aqueous acid solution and thereby increase the net available $H^+$ ions associated with the original phosphatic solution.

2. The process of claim 1 wherein the temperature is about 100°C.

3. The process of claim 1 wherein $Ca^{++}$ ion source is gypsum.

4. The process of claim 1 wherein the aqueous phosphatic acid solution is a condensate from a phosphate rock digester which produces phosphoric acid.

5. The process of claim 1 wherein the aqueous phosphatic acid solution is a condensate effluent from a phosphoric acid concentrator.

6. The process of claim 1 wherein the aqueous phosphatic acid solution is phosphoric acid process pond water.

7. The process of claim 5 wherein the condensate solution is combined with the condensate effluent from a phosphoric acid concentrator, so as to form said aqueous phosphatic acid solution.

* * * * *